S. H. MOOR.
Horse-Powers.

No. 148,377. Patented March 10, 1874.

Witnesses:
Chas. Nida
J. Sedgwick

Inventor:
S. H. Moor
Per Munn & Co.
Attorneys.

UNITED STATES PATENT OFFICE.

SAMUEL H. MOOR, OF SPRINGFIELD, MISSOURI.

IMPROVEMENT IN HORSE-POWERS.

Specification forming part of Letters Patent No. 148,377, dated March 10, 1874; application filed December 1, 1873.

*To all whom it may concern:*

Be it known that I, SAMUEL H. MOOR, of Springfield, in the county of Greene and State of Missouri, have invented a new and Improved Horse-Power, of which the following is a specification:

My invention consists of a contrivance of multiplying gears, by which it is designed to convert some of the force expended on the bearings into effective force, so as to economize power.

Figure 1:
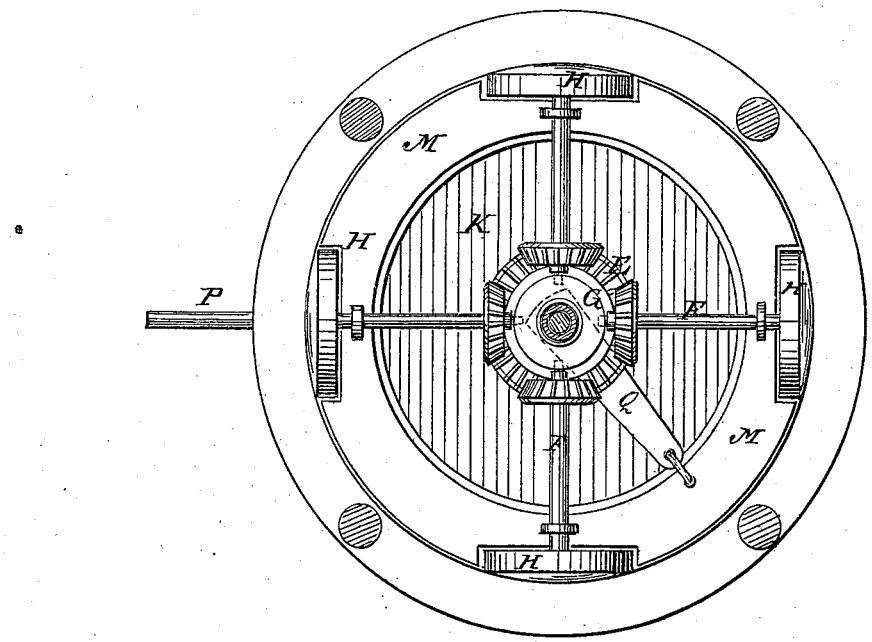
Figure 2:
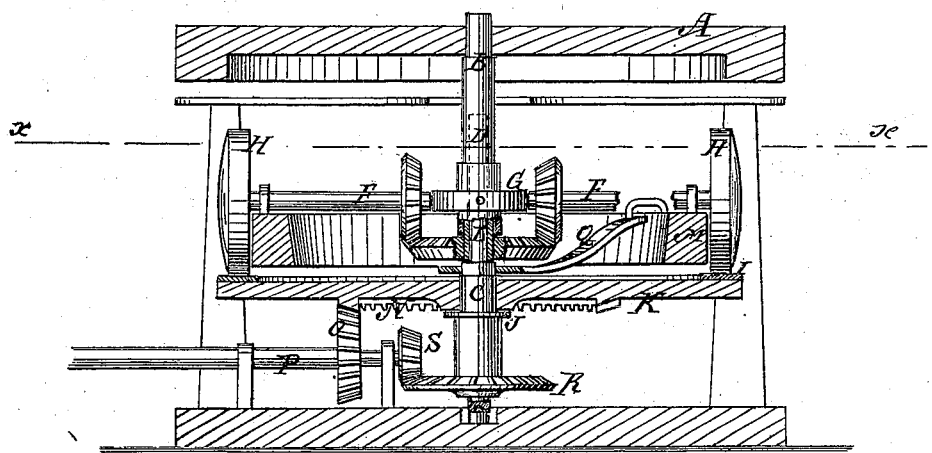

Figure 1 is a horizontal sectional elevation of my improved machine, taken on the line $xx$ of Fig. 2; and Fig. 2 is a sectional elevation.

Similar letters of reference indicate corresponding parts.

A is a tread-wheel, for applying the power by a horse or other animal walking on it, or by animals hitched to it and walking around the machine. When used as a tread-wheel it may either be horizontal, as shown in the drawing, or inclined, as such wheels sometimes are. It is attached to the vertical shaft B, and turns it. This shaft has a socket in the lower end, and rests on the upper portion of another shaft, C, as shown in dotted lines at D. It carries the bevel-wheel E at its lower end, which turns four radial shafts, F, which are journaled at their inner ends in a loose collar, G, on shaft B, and have a truck-wheel, H, at the outer ends, which rolls around on a circular track, I, on a disk or frame, K, supported on the collar J of shaft C, which passes through it. These radial shafts are loaded with a heavy metal ring, M, to create friction of the wheels H on the track I, and cause said wheels to turn disk K. The motion is transmitted from the disk by a cog-rim, N, on the under side, which turns the wheel O on the transmitting-shaft P. The ring M is connected, by an arm, Q, with the shaft C, and the latter has a wheel, R, gearing with the pinion S on shaft P, so arranged that, in case the wheels H should be liable to roll around on track I without imparting motion to it, the ring would maintain the motion of the shaft P; but as said shaft is geared with the disk, it cannot turn without the disk turns; therefore, the motion is equally divided between the disk and the ring, and both unite their forces on the transmitting-shaft, but on opposite sides of it, each having the other for its bearing or resistance to its counterforce, so that a considerable measure of force is utilized, which, in ordinary arrangements, is lost on the bearings. Moreover, this counterforce acts on the disk near the periphery and on the wheels H, so that its effect on the transmitting-shaft is largely increased by the leverage thus obtained.

Having thus described my invention, I claim as new and desire to secure by Letters Patent—

The combination of shaft B, radial shafts F, wheels H, disk K, ring M, shaft C, and transmitting-shaft P, the disk and the shaft C being geared to the transmitting-shaft, and the ring M connected to the shaft C, all substantially as specified.

SAMUEL H. MOOR.

Witnesses:
JAMES HEGARTY,
P. H. GILLESPIE.